United States Patent Office 3,491,065
Patented Jan. 20, 1970

3,491,065
AIR DRYING POLYESTER RESINS
Warren Albert Ledger, London, England, assignor to Coates Brothers & Company Limited, London, England, a British company
No Drawing. Filed Mar. 20, 1967, Ser. No. 624,123
Claims priority, application Great Britain, Oct. 19, 1966, 46,856/66
Int. Cl. C08g 17/10
U.S. Cl. 260—75
6 Claims

ABSTRACT OF THE DISCLOSURE

Air-drying polyester resins based on the incorpoation of allyl ethers are improved by the further incorporation of hexachlorendomethylene tetrahydrophthalic acid or anhydride.

This invention relates to air-drying surface coating resins. Such resins, which dry by an oxidative mechanism, have usually been based wholly or partly on the so-called drying or semi-drying oils such as linseed and soya-beans, etc. or the fatty acids derived from them which are largely composed of polyunsaturated fatty acids such as linolenic or linoleic acids.

It is known that improved surface coatings are obtained by incorporating these fatty acids into a polyester by reaction with a dibasic acid such as phthalic acid and a polyol such as glycerol or pentaerythritol. Such oil modified alkyd resins still depend for their air-drying properties, however, on the reactions of the component polyunsaturated fatty acid residues.

In recent years other compounds have been discovered which react with air in a manner similar to that of the polyunsaturated fatty acids. Among these other compounds are unsaturated ethers such as allyl and methallyl ethers, and, in particular, the partial allyl ethers of polyols have recently been proposed in surface coatings.

We have now discovered that superior air-drying resins which air-dry rapidly to trough films of excellent colour retention can be made by forming a polyester containing an allyl ether of a polyol together with hexachlorendomethylene tetrahydrophthalic acid or its anhydride.

The allyl ether used should have at least one and preferably has at least two allyl ether groups, and at least one free hydroxyl group or epoxy group per molecule. The polyester should also contain saturated aliphatic dibasic acid residues of chain length greater than 5 carbon atoms (preferably greater than 6 carbon atoms) and should be made with sufficient polyol and, optionally, aromatic or aliphatic di- or polybasic acid to give an excess of hydroxyl groups.

Conventional methods of preparing the polyesters may be used; thus the allyl ether, acids and polyols can be charged to a vessel containing a stirrer, thermometer, inert gas inlet and Dean & Stark separator and reacted at 180–200° C. using a proportion of azeotrope-forming solvent such as xylol to remove the water formed. The reaction mixture is typically reacted to an acid value between 10 and 15 and then diluted with hydrocarbon solvent to a suitable viscosity for use. The adjustment of the composition with polyol and di- or polybasic acid to give an excess of hydroxyl groups is a conventional expedient well known to those skilled in the art.

Among the allyl ether components suitable are glycerol mono allyl ether, allyl glycidyl ether and sorbitol tetra allyl ether but we particularly prefer the allyl ethers of trimethylol propane because of their superior colour retention during preparation of the resin. Either the mono allyl ether or the diallyl ether can be used but we prefer to use the diallyl ether alone or mixtures containing a high proportion of the diallyl ether because of the greater ease with which sufficient allyl groups can be incorporated into the product to obtain the desired properties. We have found that to obtain the best properties the ratio of equivalents of allyl ether to total equivalents of acid and polyol charged to the reactor should be greater than 1:4 and preferably greater than 1:3.

The second component of the invention, known as hexachloro endomethylene tetrahydrophthalic anhydride or 1,4,5,6,7,7 hexachloro bicyclo (2,2,1) hept-5-ene 2,3 dicarboxylic acid will be referred to for convenience as "chloro acid." Either the acid or its anhydride or mixtures of the two can be used in the practice of this invention and for optimum properties the ratio of the number of equivalents of allyl ether to the number of moles of chloro acid should be between 1:1.25 and 1:4.0 and preferably between 1:1.5 and 1:3.0.

The aliphatic dibasic acid can be adipic, azelaic, sebacic or similar acids but we particularly prefer dimer acid because of the improved solubility in aliphatic hydrocarbons thus obtained. By dimer acid we mean dimerised fatty acids and the commercially available mixtures of polymerised fatty acids which contain a high proportion of dimerised fatty acid together with other low polymers and monomer acid. Dimer acids which have been partly or wholly hydrogenated to give saturated acids can also be used as part or all of the aliphatic dibasic acid component. The ratio of moles of aliphatic dibasic acid to moles of chloro acid should be in the range of 1:4 to 4:1 and preferably in the range 1:2 to 2:1.

A proportion of saturated aromatic or aliphatic dibasic acid such as succinic or phthalic acids or anhydrides or other such acids known in the art can optionally be used in a molar proportion up to or equal to that of the chloro acid.

The components of the polyester are completed by a polyol such as is used in the preparation of alkyd resins and which may be, for example, pentaerythritol, glycerol, trimethylol propane and the like, used in such a quantity that the ratio of hydroxyl equivalents (including those in the allyl ether) to acid equivalents charged is between 1.05:1 and 1.25:1 and preferably between 1.10:1 and 1.15:1.

EXAMPLE 1

A reaction mixture comprising 2.4 moles chloro acid, 1.2 moles azelaic acid, 1.8 moles glycerol and 2.64 moles trimethylol propane diallyl was charged to a 2-litre glass reaction vessel fitted with a stirrer, thermometer, nitrogen inlet and separator. 100 g. of xylol was added as entraining solvent. The mixture was heated to 195° C. and maintained there for 7 hours during which time the acid value fell to 3.9 and 145 ml. water were removed as the azeotrope. The product was cooled and discharged and then thinned to 77.5% solids with mixed aromatic and aliphatic hydrocarbon solvent.

To 100 g. of the product was added 1.3 g. of 6% cobalt naphthenate solution and 53.7 g. of mixed hydrocarbon solvents (approximately 70% aromatic, 30% aliphatic). After standing for 3 days a film of this was spread on a weighed piece of aluminium foil and allowed to stand for seven days. The foil was then re-weighed and extracted with methyl ethyl ketone. After allowing residual methyl ethyl ketone to evaporate, the foil was re-weighed and the amount of film remaining calculated. Expressed as a percent of the film weight before extraction this was 74.1%.

A similar resin, made with dodecenyl succinic anhydride instead of the chloro acid had methyl ethyl ketone—inextractable content of only 48%.

A further quantity of the resin solution was made into a white paint as follows:

Equal weights of resin solution and rutile titanium dioxide were mixed and passed through a single roll mill. 160 parts of the resultant paste were then mixed with a further 57.5 parts of resin solution and 1.75 parts of 6% cobalt naphthenate solution and thinned with mixed aromatic-aliphatic solvent until the viscosity was 3.0 poise at 25° C. This required 52.5 g. of solvent. This paint was spread on an aluminium panel and became sand dry in 1 hour. A similar panel after drying for 1 week had a Persoz hardness of 83%. A 62% oil length soya alkyd resin after a similar drying period had a Persoz hardness of 42%.

Further examples of the invention are given in the accompanying tables. These further examples were prepared by the procedure of Example 1. The first table sets out the reactants for the resins, the second sets out the properties of the resulting coating resins.

TABLE 1

| | Chloro acid | Aliphatic type | Dibasic acid amount | Phthalic anhydride | TMPE | Glycerol |
|---|---|---|---|---|---|---|
| Control 1 | Nil | DDSA* | 1.2 | 2.2 | 2.1 | 1.8 |
| Example I | 2.4 | Azelaic | 1.2 | Nil | 2.64 | 1.8 |
| Example II | 1.0 | ___do___ | 1.0 | 1.0 | 2.15 | 1.5 |
| Example III | 2.2 | Hydrogenated dimer acid | 1.0 | Nil | 2.15 | 1.5 |
| Example IV | 1.1 | Dimer acid | 1.0 | 1.1 | 2.0 | 1.7 |

*Dodecenylsuccinic anhydride.
All proportions are expressed in moles.

TABLE 2

| Resin | Acid value, mg. KOH/g. | MEK inextractable, 1 week, percent | Sand dry, hrs. | Persoz hardness, 1 week |
|---|---|---|---|---|
| Control I | 9.23 | 48.7 | | |
| Example I | 3.5 | 74.1 | 1 | 79 |
| Example II | 7.0 | 66.2 | 2.3 | 70 |
| Example III | 2.7 | 81.1 | 2.3 | 74 |
| Example IV | 9.9 | 76.0 | 6.0 | 69 |
| 62% oil length soya alkyd | 12 | 76 | 2.25 | 38 |

I claim:
1. An air-drying polyester resin which is the product of the process of reacting together a chloro acid selected from the group consisting of hexachloroendomethylene tetrahydrophthalic acid and hexachloroendomethylene tetrahydrophthalic anhydride, a saturated aliphatic dibasic acid of chain length greater than five carbon atoms, an allyl ether selected from the group consisting of glycerol mono allyl ether, allyl glycidyl ether, sorbitol tetra allyl ether, mono allyl ether of trimethylol propane and diallyl ether of trimethylol propane, and a polyol selected from the group consisting of pentaerythritol, glycerol and trimethylol propane, sufficient polyol being present to give an excess of hydroxy groups.

2. The product of claim 1 further including in the reaction a material selected from the group consisting of succinic and phthalic acids and their anhydrides in molar proportion up to or equal to that of the chloro acid.

3. The product of claim 1 wherein the ratio of equivalents of allyl ether to the total equivalents of acid and polylol in the reaction is greater than 1:4.

4. The product of claim 1 wherein the ratio of equivalents of allyl ether to the number of moles of chloro acid in the reaction is between 1:1.25 and 1:4.0.

5. The product of claim 1 wherein the ratio of moles of aliphatic dibasic acid to moles of chloro acid in the reaction is between 1:4 and 4:1.

6. The product of claim 1 wherein the ratio of hydroxy equivalents to acid equivalents in the reaction is between 1.05:1 and 1.25:1.

References Cited

UNITED STATES PATENTS

| 2,779,701 | 1/1957 | Robitschek et al. | 154—43 |
| 2,783,215 | 2/1957 | Robitschek et al. | 260—45.4 |
| 2,852,487 | 9/1958 | Maker | 260—45.4 |
| 3,196,191 | 7/1965 | Haigh | 260—869 |

FOREIGN PATENTS

| 1,035,651 | 7/1966 | Great Britain. |

OTHER REFERENCES

Waters et al., Paint Varnish Prod. 53, 97–100 (1963) (chem. abstr. supplied).

WILLIAM H. SHORT, Primary Examiner

M. GOLDSTEIN, Assistant Examiner

U.S. Cl. X.R.

260—22, 33.6, 869